(12) United States Patent
Li et al.

(10) Patent No.: US 7,301,790 B2
(45) Date of Patent: Nov. 27, 2007

(54) NON-ISOLATED DC/AC FULL-BRIDGE CONVERTER WITH PRE-BOOSTING

(75) Inventors: Chih-Chang Li, Taoyuan Shien (TW); Lei-Ming Lee, Taoyuan Shien (TW)

(73) Assignee: Delta Electronics, Inc. (TW)

( * ) Notice: Subject to any disclaimer, the term of this patent is extended or adjusted under 35 U.S.C. 154(b) by 80 days.

(21) Appl. No.: 11/409,763

(22) Filed: Apr. 24, 2006

(65) Prior Publication Data

US 2006/0250831 A1    Nov. 9, 2006

(30) Foreign Application Priority Data

May 6, 2005    (TW)    ................ 94114810 A

(51) Int. Cl.
*H02M 7/5387*    (2006.01)
(52) U.S. Cl. ....................................................... 363/132

(58) Field of Classification Search ................ 363/132, 363/56.02
See application file for complete search history.

(56) References Cited

U.S. PATENT DOCUMENTS 6,038,142 A * 3/2000 Fraidlin et al. ................ 363/17

* cited by examiner

*Primary Examiner*—Shawn Riley
(74) *Attorney, Agent, or Firm*—Volpe and Koenig, PC

(57) ABSTRACT

A non-isolated dc/ac converter for converting a dc input source into an ac output source is provided. The converter includes a dc/dc converting module and a dc/ac converting module. The dc/dc converting module includes a voltage shift circuit receiving an input voltage from the dc input source and outputting the input voltage, and a voltage boost circuit boosting an output voltage from the dc/dc converting module when the input voltage from the voltage shift circuit is insufficient for the ac output source. The dc/ac converting module receives the output voltage from the dc/dc converting module and converts the output voltage into the ac output source.

12 Claims, 5 Drawing Sheets

NON-ISOLATED DC/AC FULL-BRIDGE CONVERTER WITH PRE-BOOSTING

FIELD OF THE INVENTION

The present invention relates to a converter, and more particularly to a non-isolated dc/ac converter.

BACKGROUND OF THE INVENTION

Please refer to FIG. 1, which is a circuit diagram showing a non-isolated dc/ac converter applicable to an input voltage of a wide range according to the prior art. The dc/ac converter 100 includes a first stage dc/dc converter 102 and a second stage dc/ac converter 104.

The dc/dc converter 102 includes a dc input source 106, an inductor 108, a transistor switch 110, a diode 112 and a capacitor 114. The dc/dc converter 102 modulates a dc voltage Vdc from the dc input source 106 through the transistor switch 110 using pulse-width modulation to raise a bus voltage Vbus toward the second stage dc/ac converter 104, so that the bus voltage Vbus reaches a high and regulated voltage level.

The second stage dc/ac converter 104 includes four transistor switches 116, 118, 120 and 122, an inductor 124 and a capacitor 126. The second stage dc/ac converter 104 is electrically connected to the first stage dc/dc converter 102 to receive the bus voltage Vbus and then convert the bus voltage Vbus into an output ac voltage Vo at the load end with the switching of the transistor switches 116~122 and the filtering of the filter composed of the inductor 124 and the capacitor 126

In the application of the non-isolated dc/ac converter shown in FIG. 1, the first stage dc/dc converter 102 raises the inputted dc source to a maximum value and regulates the inputted dc source. Then the second stage dc/ac converter 104 converts the dc source from the first stage dc/dc converter 102 into an ac source to provide the load.

The non-isolated dc/ac converter applicable to an input voltage of a wide range according to the prior art has some drawbacks as follows:

1. No matter the ac voltage at the output ends is high or low, the first stage dc/dc converter 102 must raise the inputted dc source to the voltage value higher than the peak of the outputted voltage. Then the voltage value higher than the peak of the outputted voltage will be kept. The second stage dc/ac converter 104 must be operated under a high voltage and the power loss therefore becomes more serious.

2. The first stage dc/dc converter 102 must continue to keep the Vbus higher than the peak of the outputted voltage, so the switches in the first stage dc/dc converter 102 switch frequently. The power loss is therefore increased.

3. The storage capacitor with a high capacitance, such as the capacitor 114 shown in FIG. 1, is adopted, so the cost is increased.

SUMMARY OF THE INVENTION

It is therefore an object of the present invention to provide a non-isolated dc/ac converter for converting a dc input source into an ac output source. The switching loss is reduced effectively and the converting efficiency is therefore improved. The use of the storage capacitor with a high capacitance is not necessary anymore and the cost is reduced.

According to the foregoing aspect of the present invention, a non-isolated dc/ac converter for converting a dc input source into an ac output source is provided. The converter includes a dc/dc converting module and a dc/ac converting module. The dc/dc converting module includes a voltage shift circuit receiving an input voltage from the dc input source and outputting the input voltage, and a voltage boost circuit boosting an output voltage from the dc/dc converting module when the input voltage from the voltage shift circuit is insufficient for the ac output source. The dc/ac converting module receives the output voltage from the dc/dc converting module and converts the output voltage into the ac output source.

The non-isolated dc/ac converter further includes a feedback module for deciding an output voltage from the voltage boost circuit according to a comparison between a determined value and the output of the dc/ac converting module.

The voltage shift circuit is adopted in the present invention. When the input dc voltage is sufficient to be provided to the output voltage, the voltage boost circuit will not work and the input dc voltage is transferred through the voltage shift circuit to the dc/ac converting module. When the input dc voltage is insufficient for the demand of the output voltage, the voltage boost circuit will work and modulate the input dc voltage to precisely meet the demand of the output voltage. Therefore, the switching loss of the dc/ac converting module is reduced and the use of the storage capacitor with a high capacitance is needless. Besides, the cost is reduced and the converting efficiency is improved.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
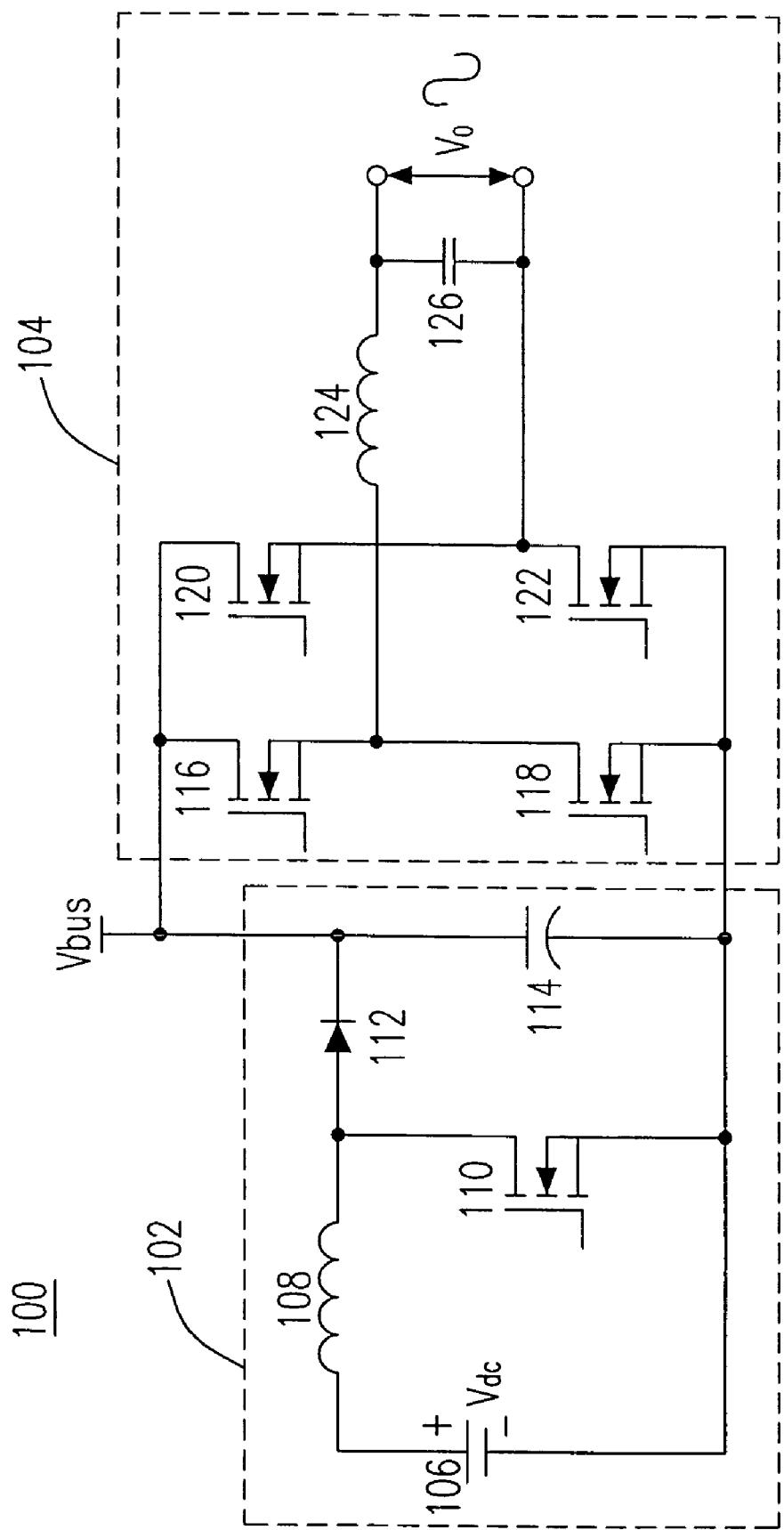
FIG. 1 is a circuit diagram showing a non-isolated dc/ac converter applicable to an input voltage of a wide range according to the prior art.
Figure 2:
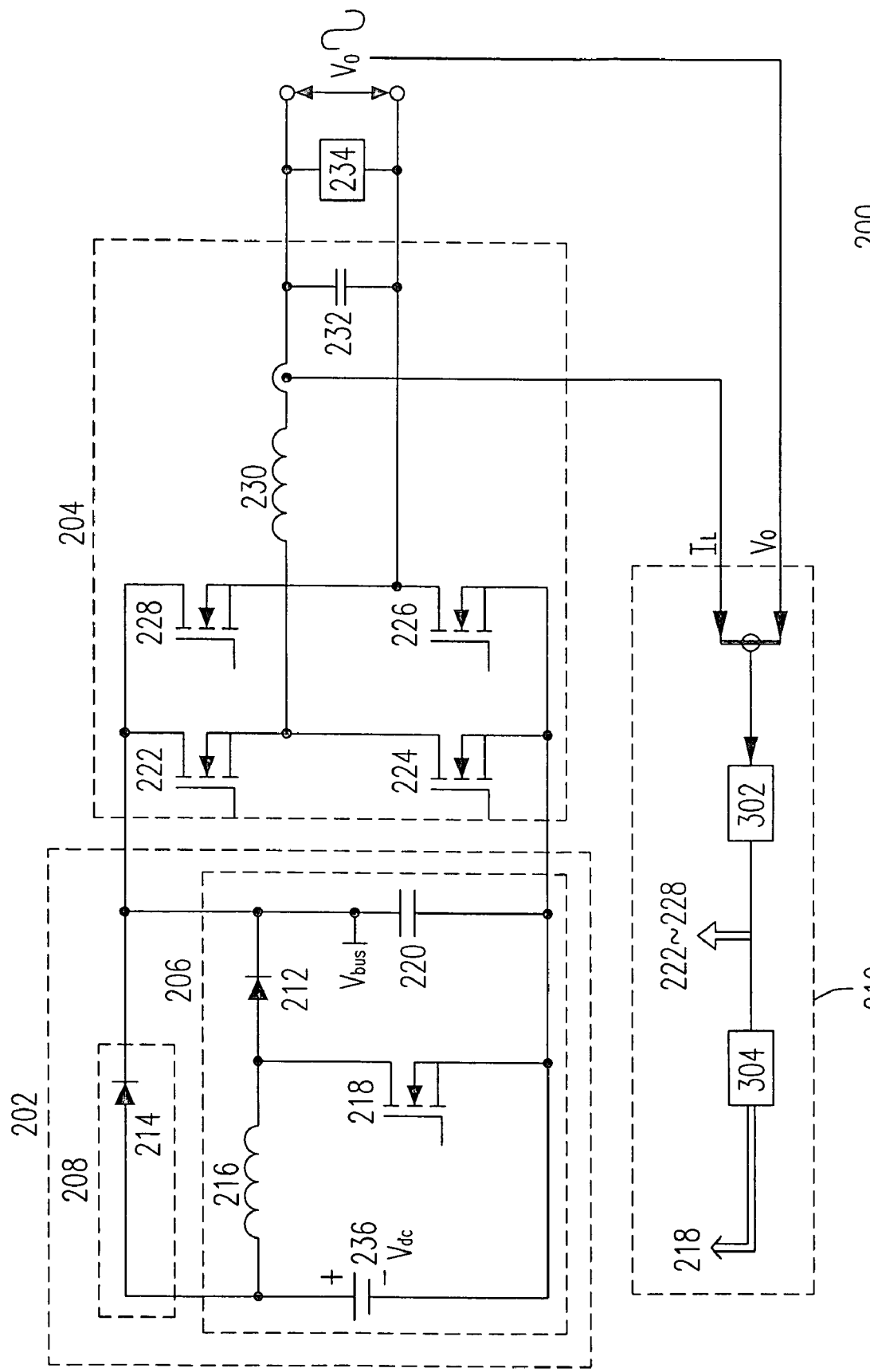
FIG. 2 is a circuit diagram showing a non-isolated dc/ac converter according to one preferred embodiment of the present invention.

Please refer to FIG. 2, which is a circuit diagram showing a non-isolated dc/ac converter according to one preferred embodiment of the present invention. The non-isolated dc/ac converter 200 includes a dc/dc converting module 202, a dc/ac converting module 204 and a feedback module 210.

The dc/dc converting module 202 in this embodiment of the present invention includes a voltage shift circuit 208 and a voltage boost circuit 206.

The voltage boost circuit 206 includes an inductor 216, a diode 212, a transistor switch 218 and a capacitor 220. One end of the inductor 216 is electrically coupled to the positive end of the dc input source 236, and the other end of the inductor 216 is electrically coupled to one diode 212. One end of the transistor switch 218 is electrically coupled between the inductor 216 and the diode 212, and the other end of the transistor switch 218 is electrically coupled between the capacitor 220 and the negative end of the dc input source 236. The capacitor 220 is electrically coupled between the other end of the diode 212 and the negative end of the dc input source 236.

The voltage shift circuit 208 includes a diode 214. The anode of the diode 214 is electrically coupled to the positive end of the dc input source 236 and the cathode of the diode 214 is electrically coupled to the capacitor 220.

Besides, the dc/ac converting module 204 of this embodiment further includes four transistor switches 222, 224, 226 and 228 and a filter composed of an inductor 230 and a capacitor 232.

In the dc/ac converting module 204, the transistor switches 222 and 224 are electrically coupled to each other with the coupled node connected to one end of the filter, one end of the inductor 230. The other end of the transistor switch 222 and the other end of the transistor switch 224 are electrically coupled to the output ends of the voltage boost circuit 206 respectively. Similarly, the transistor switches 226 and 228 are electrically coupled to each other with the coupled node connected to the other end of the filter, one end of the capacitor 232. The other end of the transistor switch 226 and the other end of the transistor switch 228 are electrically coupled to the output ends of the voltage boost circuit 206 respectively.

The operations of the non-isolated dc/ac converter 200 composed of the dc/dc converting module 202 and the dc/ac converting module 204 are as follows:

When the input voltage is sufficient for the demand of the output ends, the transistor switch 218 will be turned off so that the voltage boost circuit 206 will not work. Therefore, the dc output source 236 will be outputted by the diode 214 of the voltage shift circuit 208 to the dc/ac converting module 204. Then the transistor switches 222, 224, 226 and 228 of the dc/ac converting module 204 will be switched to use pulse-width modulation for a dc/ac converting. After the filtering of the inductor 230 and the capacitor 232, an ac output source is generated at the load 234.

Figure 3A:
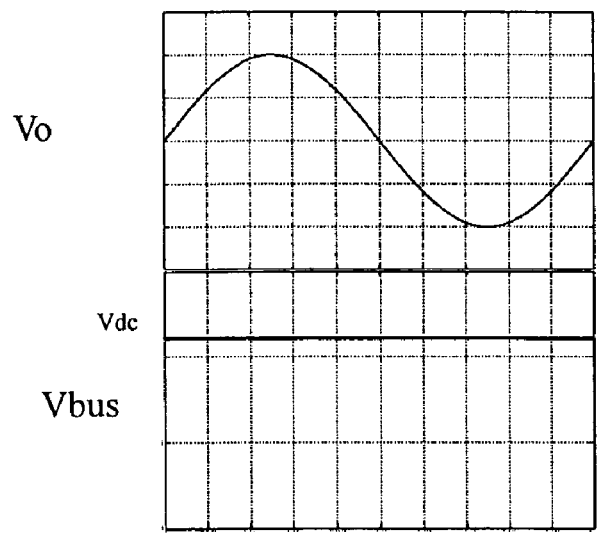
FIG. 3(a) is a time diagram showing the variations of the output voltage Vo of the ac output source and the output voltage Vbus of the dc/dc converting module when the input voltage source is sufficient for the maximum voltage at the output ends according to the present invention.

Please refer to FIG. 3(a), which is a time diagram showing the output voltage Vo of the ac output source and the output voltage Vbus of the dc/dc converting module when the input voltage source is sufficient for the maximum voltage at the output ends according to the present invention. The above operation will become much clearer according to FIG. 3(a).

Moreover, when the dc voltage outputted from the voltage shift circuit 208 is insufficient for the demand of the output ends, the transistor switch 218 will be switched to use pulse-width modulation, so that the dc power of the dc input source 236 is raised by the voltage boost circuit 206 to a demanded level. Then the transistor switches 222, 224, 226 and 228 of the dc/ac converting module 204 are turned on or turned off according to the positive or negative half cycle to provide an a demanded output source at the load 234.

The pulse-width modulation by the transistor switches 222, 224, 226 and 228 of the dc/ac converting module 204 is as follows. When the outputted ac voltage is in the positive half cycle and the voltage boost circuit 206 starts to work, the transistors 222 and 226 will be turned on and the transistors 224 and 228 will be turned off. On the contrary, when the outputted ac voltage is in the negative half cycle and the voltage boost circuit 206 starts to work, the transistors 222 and 226 will be turned off and the transistors 224 and 228 will be turned on.

Figure 3B:
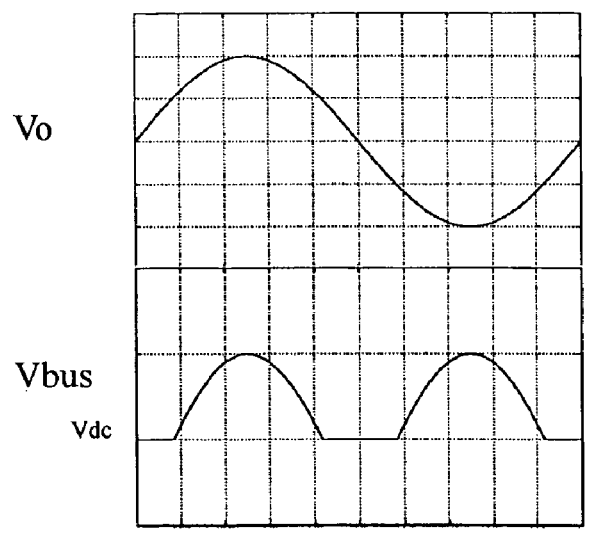
FIG. 3(b) is a time diagram showing the output voltage Vo of the ac output source and the output voltage Vbus of the dc/dc converting module when the input voltage source is insufficient for the maximum voltage at the output ends according to the present invention.

Please refer to FIG. 3(b), which is a time diagram showing the output voltage Vo of the ac output source and the output voltage Vbus of the dc/dc converting module when the input voltage source is insufficient for the maximum voltage at the output ends according to the present invention. The above operation will become much clearer according to FIG. 3(b).

According to the above operations, it is clear that the non-isolated dc/ac converter of the present invention has the following advantages in comparison with the prior art:

1. The operation of the second stage dc/ac converting module is based on the ac source at the output ends is high or low, so the transistors of the dc/ac converting module (the transistors 222~228 in the embodiment) do not need to be kept being switched under a high voltage. The power loss is therefore reduced.

2. The operation of the first stage dc/dc converting module is based on the ac source at the output ends is high or low, so the transistor of the dc/ac converting module (the transistor 218 in the embodiment) do not need to be switched continuously. The power loss is also reduced.

3. The circuit and the control method of the present invention are different from the prior art. The capacitance of the capacitor (the capacitor 220 in the embodiment) adopted in the present invention is much lower than the prior art. The cost is therefore reduced.

The circuit and the control method are described as above. The feedback circuit of the present invention is illustrated as follows. It is noticeable that the technical features of the present invention exist in the above circuits. Meanwhile, there are lots of designs for the feedback circuit. The feedback circuit provided in the following embodiment is one of them. Different circuit topologies of the feedback circuit are still included within the spirit and scope of the appended claims.

Figure 4:
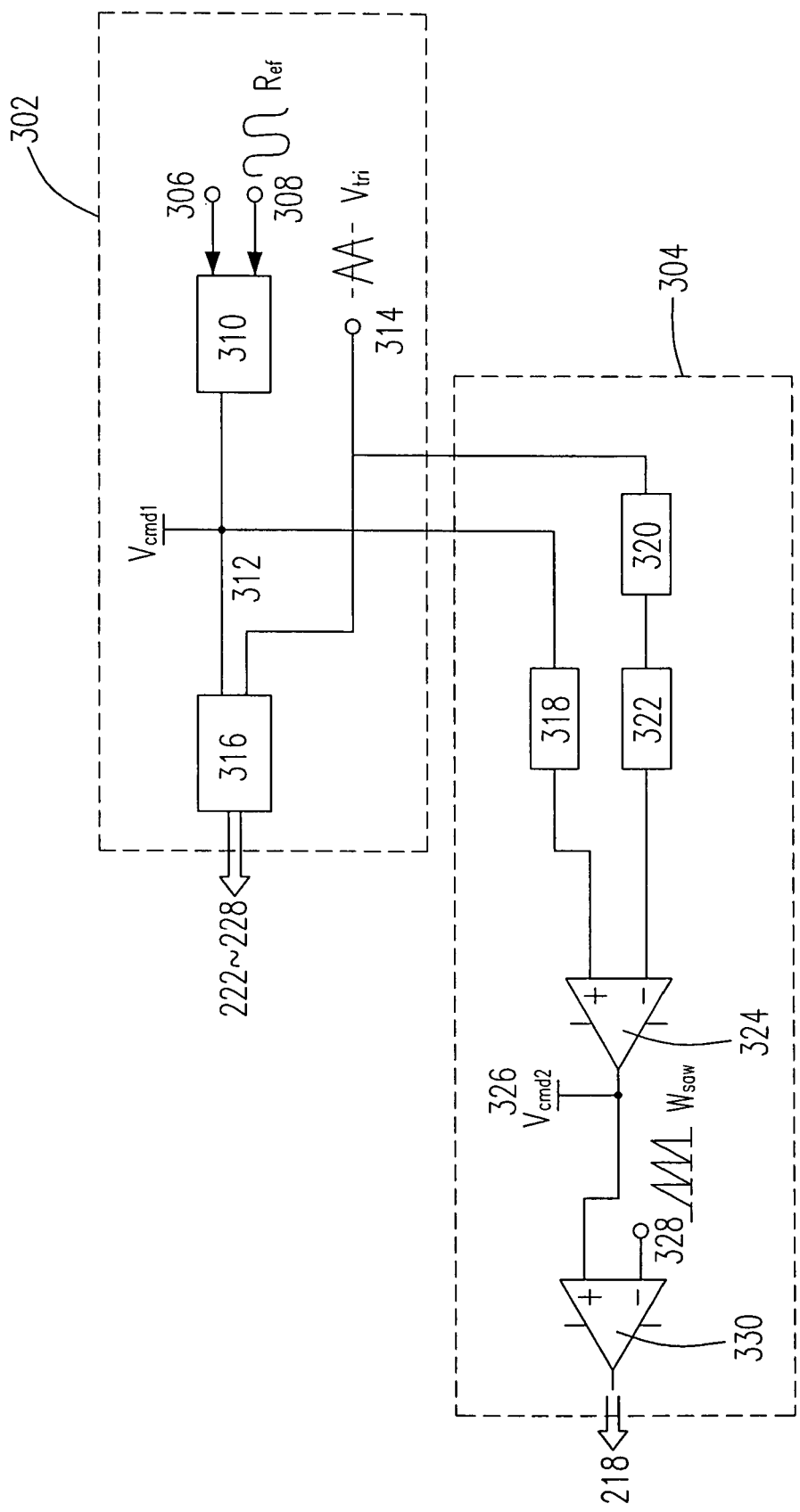
FIG. 4 is a circuit diagram showing a feedback module of the non-isolated dc/ac converter according to the present invention.

Please refer to FIG. 4, which is a circuit diagram showing a feedback module of the non-isolated dc/ac converter according to the present invention. The feedback module 210 includes a first controller 302 and a second controller 304.

The first controller 302 includes an error compensator 310 and a width-modulating pulse generator 316. The error compensator 310 compares a reference signal 308 with the feedback signal 306 of the dc/ac converting module 204, and outputs an error compensating signal 312 to the input end of the width-modulating pulse generator 316. The width-modulating pulse generator 316 receives a triangular wave 314 and the error compensating signal 312.

The second controller 304 includes a first absolute value controller 318, a second absolute value controller 320, a peak holder 322, a subtractor 324 and a comparator 330. The first absolute value controller 318 receives the error compensating signal 312 and outputs a first absolute value signal. The second absolute value controller 320 receives the triangular wave 314 and outputs a second absolute value signal. The peak holder 322 receives the second absolute value signal and holds the peak of the second absolute value signal. The subtractor 324 compares the first absolute value signal with the output of the peak holder 322 to output a subtraction result 326. The comparator 330 compares the subtraction result 326 with a sawtooth wave 328.

In the embodiment, when the inputted dc voltage is sufficient for the outputted voltage, the transistor switch 218 of the voltage boost circuit are turned off by the feedback signal from the second controller 304 of the feedback module 210. The inputted dc voltage is then transferred by the voltage shift circuit 208 to the dc/ac converting module 204. After the error compensator 310 of the first controller 302 in the feedback module 210 compares a reference signal 308 with the current or voltage signal 306 feedbacked by the dc/ac converting module 204, the error compensating signal 312 is outputted to the input end of the width-modulating pulse generator 316. The width-modulating pulse generator 316 receives the triangular wave 314 and the error compensating signal 312 to generate an output wave for controlling the transistor switches 222~228 of the dc/ac converting module 204 to achieve the pulse-width modulation.

On the contrary, when the inputted dc voltage is insufficient for the outputted voltage, the error compensator 310 of the first controller 302 in the feedback module 210 compares the reference signal 308 with the current or voltage signal 306 feedbacked by the dc/ac converting module 204. The error compensating signal 312 is then outputted to the input end of the width-modulating pulse generator 316. The width-modulating pulse generator 316 receives the triangular wave 314 and the error compensating signal 312 to generate an output wave for controlling the transistor switches 222~228 of the dc/ac converting module 204 to be turned on or turned off.

In the second controller 304, the first absolute value controller 318 receives the error compensating signal 312 and outputs the first absolute value signal. The second absolute controller 320 receives the triangular wave 314 and outputs the second absolute signal. The subtractor 324 compares the first absolute value signal with the second absolute value signal held by the peak holder 322 to generate the subtraction result 326 to the comparator 330. The comparator 330 controls the transistor 218 of the dc/dc converting module 202 according to the subtraction result 326 and a sawtooth wave 328 so that the inputted dc voltage is converted an ac source at the output ends with the pulse-width modulation.

Additionally, depending on the different applications, the source at the output ends in the present invention can be a voltage source or a current source.

Figure 5:
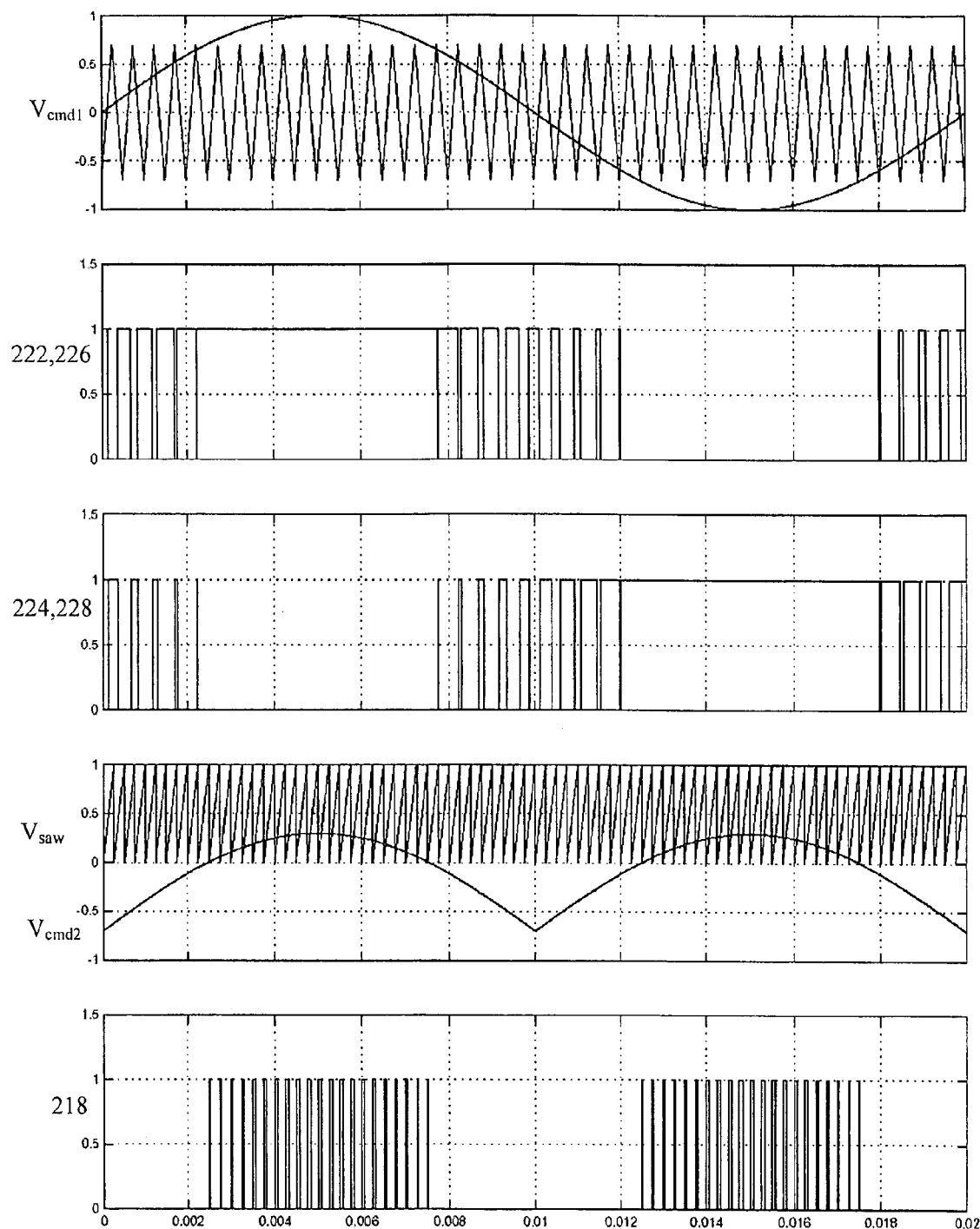
FIG. 5 is a time diagram showing the voltage variations of nodes in the feedback module in the non-isolated dc/ac converter according the present invention.

Please refer to FIG. 5, which is a time diagram showing the voltage variations of nodes in the feedback module in the non-isolated dc/ac converter according the present invention. The voltage variations of the error compensating signal (Vcmd1) 312, the transistors 222 and 226, the transistors 224 and 228, the sawtooth wave (Vsaw) 328, the subtraction result (Vcmd2) 326 and the transistor 218 are shown respectively in turn. The above operations will become much clearer according to FIG. 5.

In conclusion, the non-isolated dc/ac converter provided in the present invention is able to reduce the switching loss of the transistor switches. The use of the storage capacitor with a high capacitance in the prior art is therefore needless, the cost is reduced and the converting efficiency is improved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A non-isolated dc/ac converter for converting a dc input source into an ac output source, comprising:
   a dc/dc converting module, comprising;
      a voltage shift circuit receiving an input voltage from said dc input source and outputting said input voltage; and
      a voltage boost circuit boosting an output voltage from said dc/dc converting module when said input voltage from said voltage shift circuit is insufficient for said ac output source; and
   a dc/ac converting module receiving said output voltage from said dc/dc converting module and converting said output voltage into said ac output source.

2. The non-isolated dc/ac converter as claimed in claim 1, wherein:
   said voltage shift circuit comprises a first switch, one end of said first switch is electrically coupled to one end of said dc input source, the other end of said first switch is electrically coupled to one end of a first capacitor, and the other end of said dc input source is electrically coupled to the other end of said first capacitor.

3. The non-isolated dc/ac converter as claimed in claim 2, wherein said first switch is a diode.

4. The non-isolated dc/ac converter as claimed in claim 2, wherein said voltage boost circuit comprises:
   a first inductor having one end electrically coupled to one end of said dc input source;
   a second switch having one end electrically coupled to the other end of said first inductor;
   a first capacitor is electrically coupled between the other end of said second switch and the other end of said dc input source; and
   a third switch having one end electrically coupled between said first inductor and said second switch and the other end electrically coupled between the other end of said first capacitor and the other end of said dc input source.

5. The non-isolated dc/ac converter as claimed in claim 4, wherein said second switch is a diode.

6. The non-isolated dc/ac converter as claimed in claim 4, wherein said third switch is a transistor.

7. The non-isolated dc/ac converter as claimed in claim 1, wherein:
   said dc/ac converting module comprises a filter, a fourth switch, a fifth switch, a sixth switch and a seventh switch, said fourth switch is electrically coupled to one end of said fifth switch and one end of said filter, said fourth switch and another end of said fifth switch are electrically coupled to two output ends of said voltage boost circuit respectively, said sixth switch is electrically coupled to one end of said seventh switch and the other end of said filter, and said sixth switch and another end of said seventh switch are electrically coupled to two output ends of said voltage boost circuit respectively.

8. The non-isolated dc/ac converter as claimed in claim 7, wherein said filter comprises:
   a second inductor having one end electrically coupled to said fourth switch and said fifth switch; and a second capacitor having one end electrically coupled to the other end of said second inductor and the other end electrically coupled to said sixth switch and said seventh switch.

9. The non-isolated dc/ac converter as claimed in claim 7, wherein said fourth, fifth, sixth and seventh switches are transistors respectively.

10. The non-isolated dc/ac converter as claimed in claim 7, further comprising a feedback module deciding a voltage value from said voltage boost circuit according to a difference between a determined value and an output of said dc/ac converting module.

11. The non-isolated dc/ac converter as claimed in claim 10, wherein said feedback module comprises:
   an error compensator outputting an error compensating signal according to a comparison between said determined value and said output of said dc/ac converting module; and
   a width-modulating pulse generator controlling said fourth, fifth, sixth and seventh switches according to said error compensating signal and a triangular wave.

12. The non-isolated dc/ac converter as claimed in claim 11, wherein said feedback module further comprises:
   a first absolute value controller receiving said error compensating signal for outputting a first absolute signal;
   a second absolute value controller receiving said triangular wave for outputting a second absolute value signal;
   a peak holder receiving said second absolute value signal and holding a peak of said second absolute value signal;
   a subtractor outputting a subtraction result according a comparison between said first absolute value signal and an output of said peak holder; and
   a comparator controlling said voltage boost circuit according to said comparison between said subtraction result and a sawtooth wave.

* * * * *